United States Patent
Sakurada et al.

(10) Patent No.: US 11,214,233 B2
(45) Date of Patent: Jan. 4, 2022

(54) ELECTRONIC KEY DEVICE, ELECTRONIC KEY SYSTEM, AND COMPUTER READABLE RECORDING MEDIUM

(71) Applicants: TOYOTA JIDOSHA KABUSHIKI KAISHA, Toyota (JP); CMC CORPORATION, Nagoya (JP)

(72) Inventors: Shin Sakurada, Toyota (JP); Yasuhisa Ohta, Toyota (JP); Naoyuki Takada, Toyota (JP); Satoru Sakuma, Nagakute (JP); Yuki Tatsumoto, Nagoya (JP); Tetsu Yajima, Nagoya (JP)

(73) Assignees: TOYOTA JIDOSHA KABUSHIKI KAISHA, Toyota (JP); CMC CORPORATION, Nagoya (JP)

( * ) Notice: Subject to any disclaimer, the term of this patent is extended or adjusted under 35 U.S.C. 154(b) by 0 days.

(21) Appl. No.: 17/148,079

(22) Filed: Jan. 13, 2021

(65) Prior Publication Data
US 2021/0237684 A1 Aug. 5, 2021

(30) Foreign Application Priority Data
Jan. 31, 2020 (JP) .............................. JP2020-014479

(51) Int. Cl.
*B60R 25/24* (2013.01)
*B60R 25/01* (2013.01)
*B60R 25/40* (2013.01)

(52) U.S. Cl.
CPC .............. *B60R 25/24* (2013.01); *B60R 25/01* (2013.01); *B60R 25/40* (2013.01)

(58) Field of Classification Search
CPC .......... B60R 25/24; B60R 25/01; B60R 25/40
See application file for complete search history.

(56) References Cited

U.S. PATENT DOCUMENTS

| | | | |
|---|---|---|---|
| 9,247,040 B1* | 1/2016 | Sutton | H04W 4/40 |
| 2007/0188301 A1* | 8/2007 | Nakajima | B60R 25/24 340/5.61 |
| 2010/0231349 A1* | 9/2010 | Tanaka | B60R 25/24 340/5.2 |
| 2013/0339720 A1* | 12/2013 | Levy | H04W 52/027 713/100 |
| 2017/0178035 A1* | 6/2017 | Grimm | G06Q 30/0645 |

FOREIGN PATENT DOCUMENTS

JP 2016-037795 A 3/2016

* cited by examiner

*Primary Examiner* — Thomas D Alunkal
(74) *Attorney, Agent, or Firm* — Sughrue Mion, PLLC

(57) ABSTRACT

An electronic key device includes: a communication device; and a processor including hardware, the processor being configured to determine whether the electronic key device is in a predetermined state, excluding a stationary state and a state where the electronic key device is positioned far away from a vehicle by a predetermined distance or more, disable execution of a function of locking or unlocking the vehicle through information communication with the vehicle via the communication device when the electronic key device is in the predetermined state, and enable execution of the function when the electronic key device is not in the predetermined state.

17 Claims, 3 Drawing Sheets

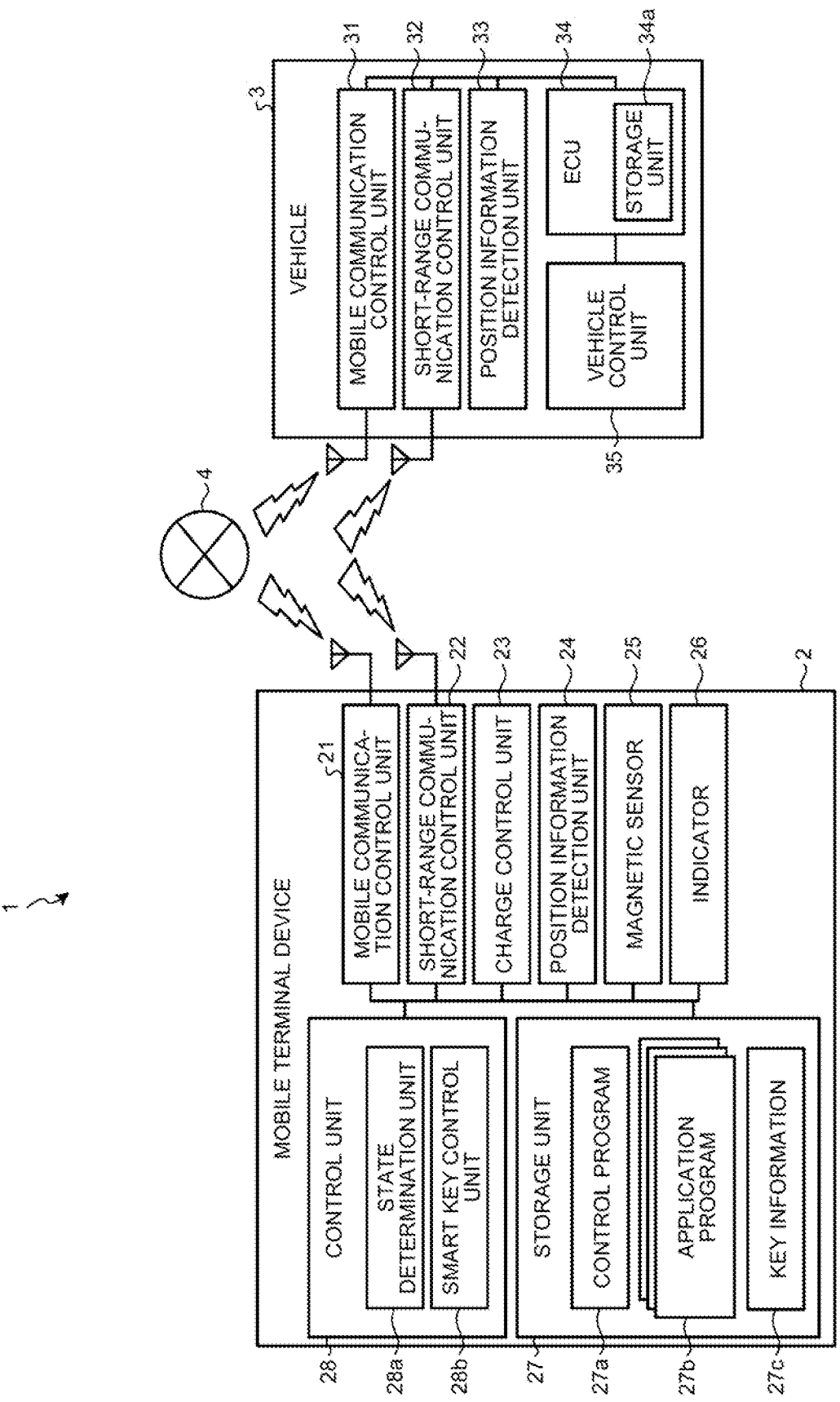

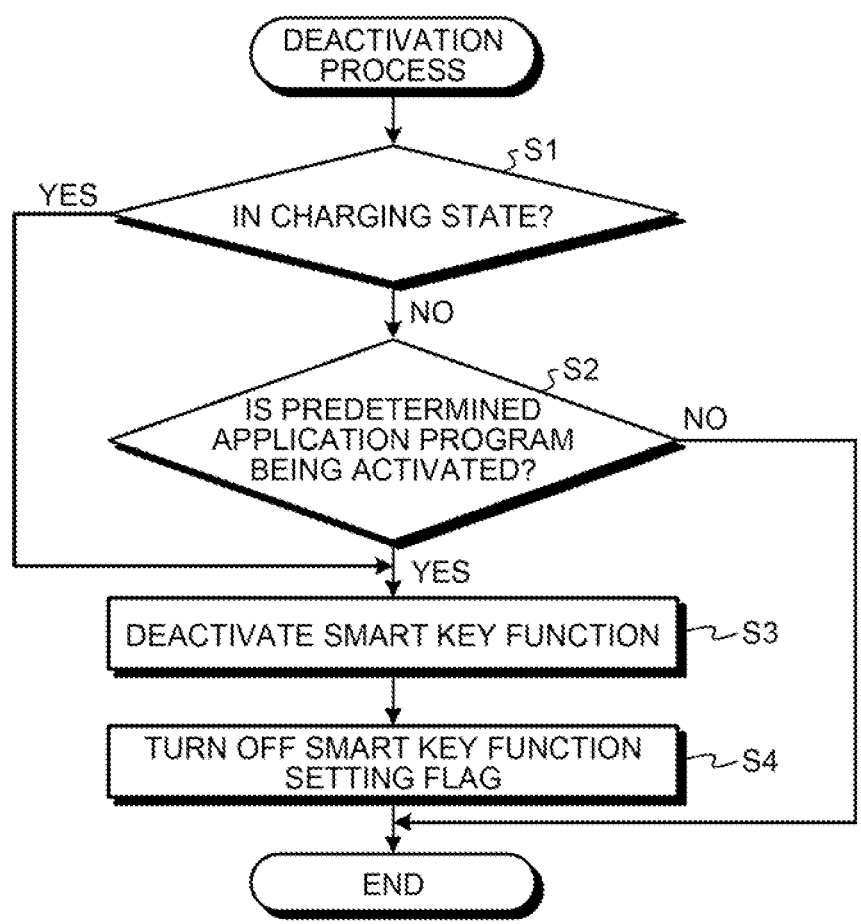

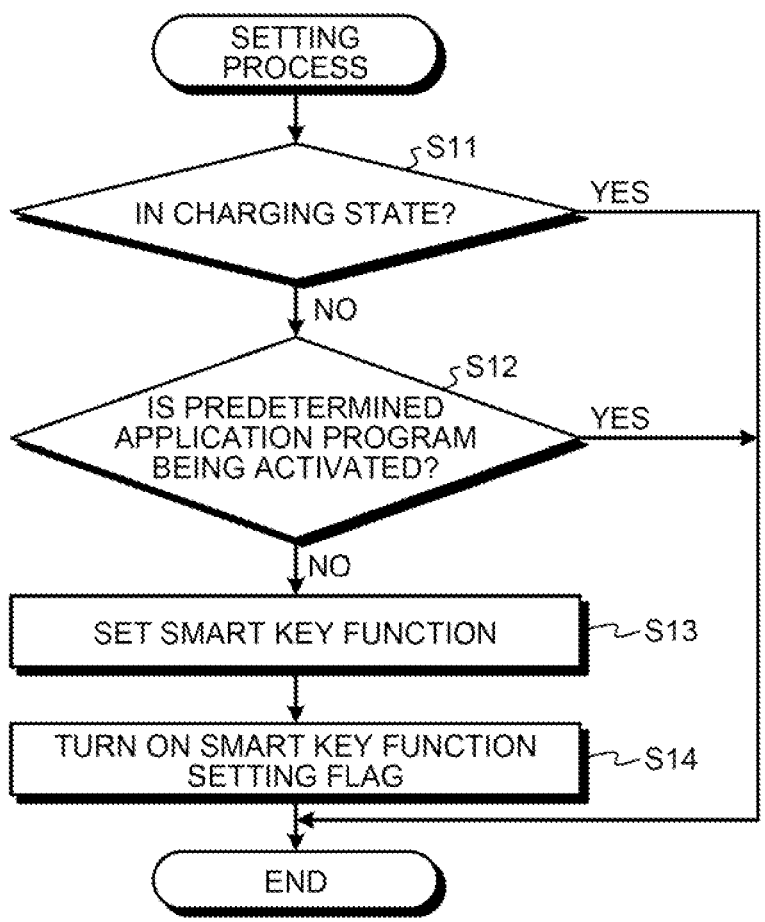

ELECTRONIC KEY DEVICE, ELECTRONIC KEY SYSTEM, AND COMPUTER READABLE RECORDING MEDIUM

The present application claims priority to and incorporates by reference the entire contents of Japanese Patent Application No. 2020-014479 filed in Japan on Jan. 31, 2020.

BACKGROUND

The present disclosure relates to an electronic key device, an electronic key system, and a computer readable recording medium.

In JP 2016-037795 A discloses a smart entry system in which an electronic key includes a magnetic sensor that detects magnetism in at least three axis directions, and when the electronic key is determined to be in a stationary state on the basis of a result of detection by the magnetic sensor, the electronic key is prohibited from performing wireless communication with an on-board unit.

SUMMARY

There is a demand for countermeasures against a relay attack that is a fraudulent act, in a smart entry system. Furthermore, causing a mobile terminal device of a user to function as an electronic key has recently been studied, but there is a demand for the countermeasures against a relay attack, as in electronic keys. Note that in the present specification, the relay attack represents a fraudulent act of fraudulently unlocking a door of a vehicle by causing the vehicle to authenticate an electronic key that is positioned far away from the vehicle, via a radio wave relayed between the vehicle and the electronic key by using radio relay devices each provided near the vehicle and key.

There is a need for an electronic key device, an electronic key system, and a computer readable recording medium that have improved security against a relay attack.

According to one aspect of the present disclosure, there is provided an electronic key device including: a communication device; and a processor including hardware, the processor being configured to determine whether the electronic key device is in a predetermined state, excluding a stationary state and a state where the electronic key device is positioned far away from a vehicle by a predetermined distance or more, disable execution of a function of locking or unlocking the vehicle through information communication with the vehicle via the communication device when the electronic key device is in the predetermined state, and enable execution of the function when the electronic key device is not in the predetermined state.

BRIEF DESCRIPTION OF THE DRAWINGS

FIG. 1 is a block diagram illustrating a configuration of a smart entry system according to an embodiment;

FIG. 2 is a flowchart illustrating a procedure of a deactivation process according to the embodiment; and FIG. 3 is a flowchart illustrating a procedure of a setting process according to the embodiment.

DETAILED DESCRIPTION

Hereinafter, a smart entry system according to an embodiment will be described in detail with reference to the drawings.

First, a configuration of the smart entry system according to the embodiment will be described with reference to FIG. 1.

FIG. 1 is a block diagram illustrating the configuration of the smart entry system according to the embodiment. As illustrated in FIG. 1, a smart entry system 1 according to the embodiment includes a mobile terminal device 2 and a vehicle 3, and the mobile terminal device 2 and the vehicle 3 are connected to each other via a telecommunication line 4 such as the Internet network or a mobile phone network so as to communicate information.

The mobile terminal device 2 functions as an electronic key device according to the present disclosure. The mobile terminal device 2 includes a device, such as a smartphone or smart key, that is configured to communicate information with the vehicle 3, the mobile terminal device 2 being carried by a user of the vehicle 3. In the present embodiment, the mobile terminal device 2 includes a mobile communication control unit 21, a short-range communication control unit 22, a charge control unit 23, a position information detection unit 24, a magnetic sensor 25, an indicator 26, a storage unit 27, and a control unit 26.

The mobile communication control unit 21 includes a communication circuit for information communication via the telecommunication line 4 and thereby the mobile communication control unit 21 controls information communication between the vehicle 3 and a server device via the telecommunication line 4. Specifically, the mobile communication control unit 21 modulates a transmission target signal to generate a signal in a frequency band of the telecommunication line 4 and transmits the signal, and demodulates a signal in the frequency band of the telecommunication line 4 received.

The short-range communication control unit 22 includes an electronic circuit having an information communication function according to a standard such as near field radio communication (NFC), Bluetooth (registered trademark) low energy (BLE), or Infrared Data Association (IrDA), and thereby the short-range communication control unit 22 controls short-range wireless communication with the vehicle 3. Specifically, the short-range communication control unit 22 modulates a transmission target signal and transmits the signal to the vehicle 3, and demodulates a signal received from the vehicle 3.

The charge control unit 23 is a device that controls a charging operation to charge a secondary battery such as a battery included in the mobile terminal device 2 from an external power source.

The position information detection unit 24 includes a device that receives a radio wave from a global positioning system (GPS) satellite to detect position information about the mobile terminal device 2, and thereby the position information detection unit 24 outputs an electric signal indicating the detected position information about the mobile terminal device 2 to the control unit 28.

The magnetic sensor 25 includes, for example, a magnetic sensor that is configured to detect geomagnetic orientation in three axis directions, and thereby the magnetic sensor 25 outputs an electric signal indicating the detected geomagnetic orientation to the control unit 28. Use of the magnetic sensor 25 makes it possible to determine, for example, whether the mobile terminal device 2 is in a stationary state.

The indicator 26, for example, lights or blinks according to a control signal from the control unit 26 to present an operation state of a smart key function to the user. Thus, the user may confirm the operating state of the smart key function at any time. Here, the "smart key function" represents a function of unlocking and locking a door of the vehicle 3 by short-range wireless communication between the mobile terminal device 2 and the vehicle 3. The smart key function includes a smart entry function and a remote keyless entry function, the smart entry function is configured so that the vehicle 3 authenticates the mobile terminal device 2 carried by the user who approaches the vehicle 3 through information communication and, for example, unlocks a door in response to the user's touching a doorknob or the like of the vehicle 3, and the remote keyless entry function is configured so that the door is, for example, unlocked in response to operation of a switch of the mobile terminal device 2 by the user. Furthermore, in the following description, turning on the smart key function to permit the door of the vehicle 3 to be unlocked by short-range wireless communication is referred to as "set (restore) the smart key function", and turning off the smart key function to prohibit the door of the vehicle 3 from being unlocked by the short-range wireless communication is referred to as "deactivate (cancel) the smart key function".

The storage unit 27 includes a recording medium such as an erasable programmable read only memory (EPROM), a hard disk drive (HDD), and a removable medium. Note that examples of the removable medium includes, for example, a universal serial bus (USB) memory and a disc recording medium such as a compact disc (CD), a digital versatile disc (DVD), and a Blu-ray (registered trademark) disc (BD). The storage unit 27 stores various computer programs and various control data necessary for the operations of the mobile terminal device 2. In the present embodiment, the storage unit 27 stores a control program 27a that is a computer program, various application programs 27b, and key information 27c used for the smart key function.

The control unit 28 includes a processor that includes a central processing unit (CPU), a digital signal processor (DSP), a field-programmable gate array (FPGA), or the like and a main storage unit that includes a random access memory (RAM), a read only memory (ROM), and the like. The control unit 28 loads a computer program stored in the storage unit 27 into a work area of the main storage unit and executes the computer program to control each unit of the mobile terminal device 2. In the present embodiment, the control unit 28 loads the control program 27a stored in the storage unit 27 into the work area of the main storage unit, executes the control program 27a, and functions as a state determination unit 28a and a smart key control unit 28b. Functions of the state determination unit 23a and the smart key control unit 28b will be described later.

The vehicle 3 includes a known vehicle such as an electric vehicle (EV), hybrid vehicle (HV), or fuel cell electric vehicle (FCEV), and the vehicle 3 includes a mobile communication control unit 31, a short-range communication control unit 32, a position information detection unit 33, an electric control unit (ECU) 34, and a vehicle control unit 35.

The mobile communication control unit 31 includes a communication circuit for information communication via the telecommunication line 4, and thereby the mobile communication control unit 31 controls information communication with the mobile terminal device 2 or the server device via the telecommunication line 4. Specifically, the mobile communication control unit 31 modulates a transmission target signal to generate a signal in a frequency band of the telecommunication line 4 and transmits the signal, and demodulates a signal in the frequency band of the telecommunication line 4 received. The mobile communication control unit 31 provided in the vehicle 3 makes it possible to achieve a remote immobilizer function of prohibiting an engine of the vehicle 3 from starting by remote operation from the mobile terminal device 2 or server device via the telecommunication line 4.

The short-range communication control unit 32 includes an electronic circuit that has an information communication function according to a standard such as NFC, BLE, or IrDA, and thereby the short-range communication control unit 32 controls short-range wireless communication with the mobile terminal device 2. Specifically, the short-range communication control unit 32 modulates a transmission target signal and transmits the signal to the mobile terminal device 2, and demodulates a signal received from the mobile terminal device 2.

The position information detection unit 33 includes a device that receives a radio wave from the GPS satellite to detect position information about the vehicle 3, and thereby the position information detection unit 33 outputs an electric signal indicating the detected position information about the vehicle 3 to the ECU 34. Note that as a method of detecting the position information about the vehicle 3, a method in which light detection and ranging, laser imaging detection and ranging (LiDAR) and a three-dimensional digital map are combined may be also adopted.

The ECU 34 includes a processor that includes a CPU, DSP, FPGA, or the like, and a storage unit 34a that includes a RAM, a ROM, and the like. The ECU 34 executes a computer program stored in the storage unit 34a to integrally control the operations of various component elements mounted on the vehicle 3. In the present embodiment, the ECU 34 collates the key information 27c transmitted from the mobile terminal device 2 with key information stored in the storage unit 34a to authenticate the mobile terminal device 2, and when the mobile terminal device 2 is authenticated, the vehicle control unit 35 is controlled to unlock or lock the door of the vehicle 3.

The vehicle control unit 35 controls the operations of various component elements mounted on the vehicle 3 according to a control signal from the ECU 34. In the present embodiment, the vehicle control unit 35 controls the locking/unlocking of the door of the vehicle 3 according to a control signal from the ECU 34.

In the smart entry system 1 having such a configuration, the mobile terminal device 2 performs a deactivation process and a setting process which are described below to improve security against a relay attack. Hereinafter, the operations of the mobile terminal device 2 in the deactivation process and the setting process will be described with reference to FIGS. 2 and 3.

FIG. 2 is a flowchart illustrating a procedure of the deactivation process according to the embodiment. The flowchart illustrated in FIG. 2 is started while a smart-key-function setting flag that indicates whether the smart key function is set is in an on state indicating that the smart key function is set, and the deactivation process proceeds to Step S1. This deactivation process is repeatedly performed each time a predetermined time has elapsed after the end of the last deactivation process, while the smart-key-function setting flag is in the on state.

In Step S1, the state determination unit 28a detects the state of the charge control unit 23 to determine whether a battery charger is connected to the mobile terminal device 2. As a result of the determination, if the battery charger is connected to the mobile terminal device 2 (Step S1: Yes), the state determination unit 28a determines that the mobile terminal device 2 is in a charging state, and the deactivation process proceeds to Step S3. On the other hand, if no battery charger is connected to the mobile terminal device 2 (Step S1: No), the state determination unit 28a determines that the mobile terminal device 2 is not in the charging state, and the deactivation process proceeds to Step S2.

In Step S2, the state determination unit 28a determines whether, of the application programs 27b stored in the storage unit 21, a predetermined application program unrelated to operating the vehicle 3 is being activated. Whether the predetermined application program unrelated to operating the vehicle 3 is being activated may be determined, for example, as follows: a table showing the types of the application programs is created in advance, and the state determination unit 28a determines whether the type of an application program loaded into the work area of the main storage unit of the control unit 28 is related to operating the vehicle 3, by referring to the table. An example of the predetermined application program unrelated to operating the vehicle 3 includes an application program relating to sleeping and/or cooking.

As a result of the determination, if the predetermined application program unrelated to operating the vehicle 3 is being activated (Step S2: Yes), the state determination unit 28a proceeds to Step S3 of the deactivation process. On the other hand, if no predetermined application program unrelated to operating the vehicle 3 is being activated (Step S2: No), the state determination unit 28a finishes a series of steps of the deactivation process.

In Step S3, the smart key control unit 23b deactivates the smart key function so as to disable the execution of the smart key function. Thus, Step S3 is completed, and the deactivation process proceeds to Step S4.

In Step S4, the smart key control unit 28b sets the smart-key-function setting flag to an off state indicating that the smart key function is deactivated. Then, the smart key control unit 28b sets the indicator 26 to a state indicating that the smart key function is deactivated. Thus, Step S4 is completed, and the series of steps of the deactivation process is finished.

FIG. 3 is a flowchart illustrating a procedure of the setting process according to the embodiment. The flowchart illustrated in FIG. 3 is started while the smart-key-function setting flag is in an off state, and the setting process proceeds to Step S1. This setting process is repeatedly performed each time a predetermined time has elapsed after the end of the last setting process, while the smart-key-function setting flag is in the off state.

In Step S11, the state determination unit 28a detects the state of the charge control unit 23 to determine whether a battery charger is connected to the mobile terminal device 2. As a result of the determination, if the battery charger is connected to the mobile terminal device 2 (Step S11: Yes), the state determination unit 28a determines that the mobile terminal device 2 is in a charging state, and finishes a series of steps of the setting process. On the other hand, if no battery charger is connected to the mobile terminal device 2 (Step S11: No), the state determination unit 28a determines that the mobile terminal device 2 is not in the charging state, and the setting process proceeds to Step S12.

In Step S12, the state determination unit 28a determines whether, of the application programs 27b stored in the storage unit 27, a predetermined application program unrelated to operating the vehicle 3 is being activated. As a result of the determination, if the predetermined application program unrelated to operating the vehicle 3 is being activated (Step S12: Yes), the state determination unit 28a finishes the series of steps of the setting process. On the other hand, if no predetermined application program unrelated to operating the vehicle 3 is being activated (Step S12: No), the state determination unit 20a proceeds to Step S13 of the setting process.

In Step S13, the smart key control unit 28b sets the smart key function so as to enable execution of the smart key function. Thus, Step S13 is completed, and the setting process proceeds to Step S14.

In Step S14, the smart key control unit 28b sets the smart-key-function setting flag to an on state. Then, the smart key control unit 28b sets the indicator 26 to a state indicating that the smart key function is set. Thus, Step S14 is completed, and the series of steps of the setting process is finished.

As is apparent from the above description, in the smart entry system 1 according to the embodiment, the control unit 28 determines whether the mobile terminal device 2 is in a predetermined state where the smart key function to lock/unlock the vehicle 3 through information communication with the vehicle 3 via the short-range communication control unit 22 is not required, excluding a stationary state of the mobile terminal device 2 and a state where the mobile terminal device 2 is positioned far away from the vehicle 3 by a predetermined distance or more, disables the execution of the smart key function when the mobile terminal device 2 is in the predetermined state, and enables the execution of the smart key function when the mobile terminal device 2 is not in the predetermined state. This configuration makes it possible to improve security against a relay attack. However, "excluding the stationary state" does not mean "without determining whether to be in the stationary state". Furthermore, the embodiment is also possible in which, for example, execution of the smart key function is disabled when the mobile terminal device 2 is in the stationary state and is in the charging state.

Note that, examples of the predetermined state as described above includes, in addition to a charging state of the mobile terminal device 2 and a state where an application program unrelated to operating the vehicle 3 is being activated, a state where the mobile terminal device 2 is positioned inside the vehicle 3 or positioned in a predesignated area such as home. Whether the mobile terminal device 2 is positioned inside the vehicle 3 may be determined by comparing the position information about the mobile terminal device 2 detected by the position information detection unit 24 with the position information about the vehicle 3 detected by the position information detection unit 33. whether the mobile terminal device 2 is positioned in the predesignated area such as home may be determined by comparing the position information about the mobile terminal device 2 detected by the position information detection unit 24 with position information about the predesignated area.

According to the present disclosure, security against a relay attack may be improved.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An electronic key device comprising:
   a communication device;
   a memory; and
   a processor comprising hardware, the processor being configured to:

determine whether the electronic key device is in a predetermined state, excluding a stationary state and a state where the electronic key device is positioned far away from a vehicle by a predetermined distance or more, disable execution of a function of locking or unlocking the vehicle through information communication with the vehicle via the communication device when the electronic key device is in the predetermined state, and enable execution of the function when the electronic key device is not in the predetermined state, wherein the predetermined state includes a state where an application program stored in the memory unrelated to operating the vehicle is activated, and wherein the processor further determines whether the application program is unrelated to operating the vehicle by comparing a type of the activated application program to a table defining types of application programs.

2. The electronic key device according to claim 1, wherein the predetermined state includes a state where the electronic key device is connected to a battery charger.

3. The electronic key device according to claim 1, wherein the application program includes an application program relating to sleeping and/or cooking.

4. The electronic key device according to claim 1, wherein the predetermined state includes a state where the electronic key device is positioned inside the vehicle.

5. The electronic key device according to claim 1, wherein the predetermined state includes a state where the electronic key device is positioned within a predesignated area.

6. The electronic key device according to claim 1, wherein the processor outputs information indicating whether the function is executable.

7. An electronic key system comprising:
a vehicle; and
an electronic key device comprising:
a communication device,
a memory, and
a processor comprising hardware, the processor being configured to
determine whether the electronic key device is in a predetermined state, excluding a stationary state and a state where the electronic key device is positioned far away from a vehicle by a predetermined distance or more, disable execution of a function of locking or unlocking the vehicle through information communication with the vehicle via the communication device when the electronic key device is in the predetermined state, and enable execution of the function when the electronic key device is not in the predetermined state, wherein the predetermined state includes a state where an application program stored in the memory unrelated to operating the vehicle is activated, and wherein the processor further determines whether the application program is unrelated to operating the vehicle by comparing a type of the activated application program to a table defining types of application programs.

8. The electronic key system according to claim 7, wherein the predetermined state includes a state where the electronic key device is connected to a battery charger.

9. The electronic key system according to claim 7, wherein the application program includes an application program relating to sleeping and/or cooking.

10. The electronic key system according to claim 7, wherein the predetermined state includes a state where the electronic key device is positioned inside the vehicle.

11. The electronic key system according to claim 7, wherein the predetermined state includes a state where the electronic key device is positioned within a predesignated area.

12. The electronic key system according to claim 7, wherein the processor outputs information indicating whether the function is executable.

13. A non-transitory computer-readable recording medium on which an executable program is recorded, the program causing a processor of a computer to execute:
determining whether an electronic key device is in a predetermined state, excluding a stationary state and a state where the electronic key device is positioned far away from a vehicle by a predetermined distance or more;

disabling execution of a function of locking or unlocking the vehicle through information communication with the vehicle via a communication device when the electronic key device is in the predetermined state; and enabling execution of the function when the electronic key device is not in the predetermined state, wherein the predetermined state includes a state where an application program stored in the memory unrelated to operating the vehicle is activated, and wherein the processor further determines whether the application program is unrelated to operating the vehicle by comparing a type of the activated application program to a table defining types of application programs.

14. The non-transitory computer-readable recording medium according to claim 13, wherein the predetermined state includes a state where the electronic key device is connected to a battery charger.

15. The non-transitory computer-readable recording medium according to claim 13, wherein the application program includes an application program relating to sleeping and/or cooking.

16. The non-transitory computer-readable recording medium according to claim 13, wherein the predetermined state includes a state where the electronic key device is positioned inside the vehicle.

17. The non-transitory computer-readable recording medium according to claim 13, wherein the predetermined state includes a state where the electronic key device is positioned within a predesignated area.

* * * * *